June 15, 1954 — J. CORYDON II — 2,681,246
PNEUMATIC RUBBER BUMPER GUARD
Filed Oct. 21, 1950
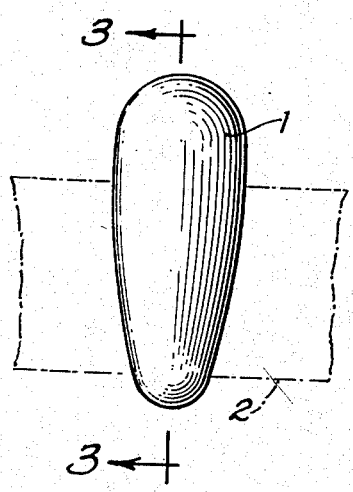
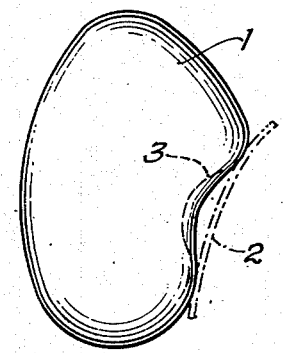
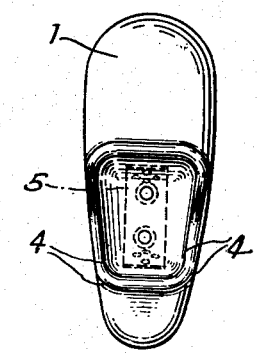
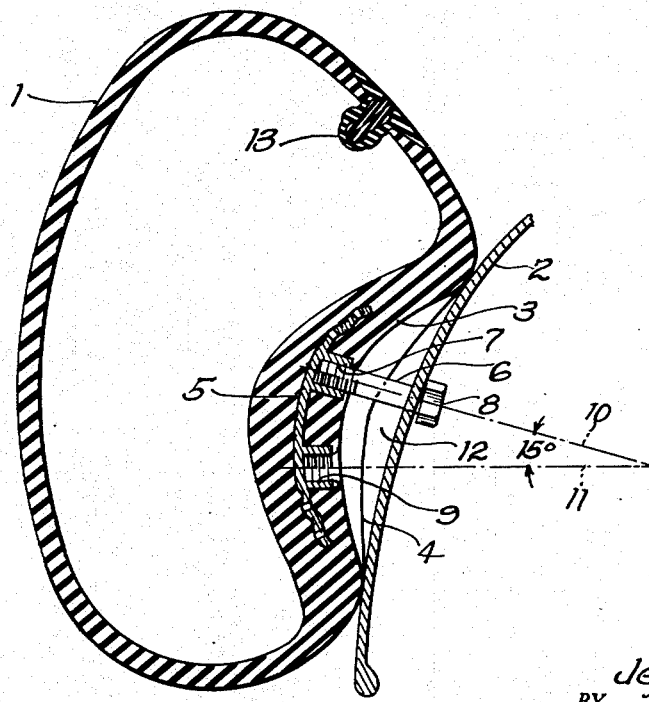
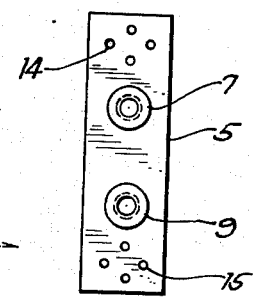
INVENTOR.
Jeff Corydon II
BY J. Warren McCaffrey
Att'y Patented June 15, 1954

2,681,246

UNITED STATES PATENT OFFICE 2,681,246

PNEUMATIC RUBBER BUMPER GUARD

Jeff Corydon II, Chicago, Ill., assignor, by mesne assignments, to Bump-Air Incorporated, Barberton, Ohio, a corporation of Delaware Application October 21, 1950, Serial No. 191,421

3 Claims. (Cl. 293—67)

This is a continuation in part of my earlier application, Serial Number 170,415 covering rubber pneumatic auto accessories, and relates specifically to pneumatic rubber bumper guards.

The inflated rubber bumper guards described and illustrated in my earlier pending application have been thoroughly tested on automobiles and have proven very practical for absorbing bumps and shocks resulting from contacts with immovable or relatively stationary objects, while at the same time eliminating noises caused by the same contacts.

Inflated rubber bumper guards of the same types as disclosed and described in my co-pending application were mounted as shown in said application on the front and rear bumpers of a passenger auto. Similar shaped guards were also mounted by different means on the front and rear of an automobile. The inflated rubber bumper guards were actually tested by bumping the thus equipped autos against other autos under parking conditions. Attempts were even made to burst the air inflated guards by bumping immovable objects with considerable force and applying substantial driving force. In all tests the bumper guards absorbed the shocks, eliminated noise, and did not burst.

My testing and experimental work has resulted primarily in further development of the kidney-shaped inflated rubber bumper guard without a bladder insert as disclosed and claimed in my co-pending application. The development work also resulted in my conception of a more secure and practical means for attaching the bumper guard to the bumpers of most of the present day passenger autos.

The object of this continuation in part of my earlier application is to separate from the multiple accessories therein described the inflated rubber bumper guards and to specifically cover their development.

A special feature of the invention is the construction of the inflated rubber bumper guard to include a suitable means molded in the rubber for fastening the guards securely to several different shapes of bumpers on current models of automobiles.

The objects and features of my inflated rubber bumper guard will be more readily understood from the following detailed description read in conjunction with the accompanying drawings in which Fig. 1 is a front elevation view of the bumper guard.

Fig. 2 is a side view of the same bumper guard.

Fig. 3 is a rear view of the bumper guard without the indicated bumper shown in Fig. 1 and Fig. 2.

Fig. 4 is an enlarged sectional view along the center line 3—3 of Fig. 1, excepting the fastening means is shown in side view.

Fig. 5 is front view of steel strip of attaching means before bending and crimping prior to being molded in back wall of rubber bumper guard.

The inflated rubber bumper guard of this invention can be mounted on the front or rear bumper of an auto either between the metallic bumper guards already on the metallic bumper, or between the metallic guards and also one on the outside of each metallic guard making three inflated rubber bumper guards in that case.

However, in order to obtain the full benefits from the use of inflated rubber bumper guards it is preferred that the usual two metallic guards be removed from the bumper and two rubber guards of this invention be mounted in their places as shown in Fig. 1 and Fig. 2 where an inflated rubber guard 1 is shown mounted on, and indicated by outline, bumper 2.

My rubber guard is constructed generally in the shape of a kidney when viewed from the side as appears in Fig. 2 and Fig. 4 of the accompanying drawings. But in the center of the rear wall of the guard, where contact with the bumper occurs, there is a conically shaped depression or cup shaped hollow indicated by dotted line 3 in Fig. 2 and more clearly shown in Fig. 3 by the irregular shaped contact edge outlined by parallel lines 4.

A special feature of my bumper guard is a bent and crimped strip of steel which makes my rubber guard easily attachable to many shapes of automobile bumpers. It is shown in dotted outline 5 in Fig. 3 as molded into the rear wall of my rubber bumper guard. However, it is shown considerably enlarged and in some detail in Fig. 4, and Fig. 5 shows the steel strip before bending and crimping.

Referring again to Fig. 4, attention is called to the extra thick rear wall of the guard so as to provide ample rubber to surround the bent and crimped steel strip 5 and also to insure a firm attachment of the guard to the bumper 2 by means of bolt 6 screwed tight into lug 7 and fastened to the bumper by nut 8. If the front face of the bumper 2 presents a different surface or angle than shown in the drawing, it might be necessary to screw bolt 6 tightly into lug 9 for fastening to bumper 2 with nut 8. The curvature of the strip 5 is the result of bending the strip until the center lines 10 and 11 of lugs 7 and 9 when extended meet to form an angle of approximately 15° as indicated in the drawing. The wavy appearances of the ends of the strip is due to crimping. In practice the bending and crimping can be performed at the same time.

Fig. 4 also shows clearly another feature of my invention, namely, the conically hollowed out space in the rear wall indicated by curved line 3 as the greatest depth of the conical hollow and by curved line 4 as the outer edge of the conical hollow which when finally adjusted on the bumper 2 and fastened thereto by bolt 6 and nut 8 is the only contacting edge of the rear wall of the guard that touches the bumper.

Fig. 4 of the drawing shows the bumper guard assembled on the bumper 2 but not tightened into its final position. As a result there is an air space 12 shown between the conical hollow in the rear wall of the guard and the face of the bumper. When fastened tight in place on the bumper, air space 12 disappears when edge 4 contacts the face of bumper 2, but there will still be an air pocket between the guard and the bumper because of the conical cavity in the rear wall of the guard. The conical cavity is another feature of my guard which serves two distinct functions. In the first place, it makes the rear of the rubber guard easily adaptable in close contact to almost any shape of bumper-face. In the second place, if the guard receives a severe blow, any continuously applied pressure will cause the rear wall to press against the bumper whereupon the air in the conical cavity will be compressed and absorb any remaining shock.

In adjusting and fastening the guard to the bumper, air from space 12 becomes confined within the irregularly shaped edges of the rubber guard and forms an extra air cushion for absorbing bumps as described. However, the conforming of the rubber guard to any shape of bumper-face is not air-tight so that, when compressed, air will escape from the conical cavity and, when the pressure is released, air will return to the conical hollow. Air is not supplied to this conical cavity as it maybe supplied to the rubber bumper guard through valve 13. This valve may be of any suitable construction, so that air under pressure from atmospheric up to 18 or 20 pounds may be introduced there-through by valvular or hypodermic means, for example.

In my earlier application covering pneumatic rubber auto accessories I employed a large headed bolt to fasten the rubber guard to the bumper and described a round metal plate being molded in the rear wall of the rubber guard with a bolt extending therefrom. I have found the bent and crimped strip described herein holds the guard more securely, and its curvature and construction makes the same inflated rubber guard attachable to several different shaped bumpers of the current models of autos instead of requiring a different shaped rear wall and different location of bolts for each different shape, size and angle of bumper. As an example, the steel strip may be approximately 1¼" x 4¼" in size and $\frac{3}{16}$" thick. Two clusters of holes may be drilled in each end about ⅛" in diameter as shown at 14 and 15 in Fig. 5 which illustrates such a strip of steel before bending and crimping. Two ⅝" diameter lugs drilled and tapped are welded to the steel strip for receiving the bolt 6. Then the strip can be bent and the ends containing the clusters of ⅛" holes waved by crimping. When the steel strip is then molded in rubber, it is securely embedded in the rear wall of the guard which is about three times the thickness of the rest of the walls of the guard. In molding care must be taken to cover the top edges of the lugs 7 and 9 with rubber as shown in Fig. 4 so that if contact is made with the bumper there would not be the noise or shock of metal against metal.

It is perfectly practical to make the bent and crimped steel strip with lugs 7 and 9 welded thereto as a single casting and then drilling and tapping the lugs so as to receive bolt 6 instead of making the piece as described in the previous paragraph. It is also within the scope of my invention to use a thinner strip of metal in the rear wall of the guard, approximately $\frac{1}{16}$ to $\frac{3}{64}$ of an inch thick, which would be more flexible than a thicker strip and would enable the rear wall to more easily conform to any irregularly shaped bumpers.

I have applied my rubber bumper guard to most of the lower priced passenger autos and found that, if the metal strip 5 was bent in an arc so that the center lines of the lugs 7 and 9 when extended would form a central angle of approximately 15°, the guard was easily attached to the current bumpers of such autos as Ford, Chevrolet, Plymouth, Studebaker, etc. Of course only one bolt 6 would be used in each case to fasten the guard to the bumper through either lug 7 and 9 as the angle and shape of the bumper-face would require.

It is the unique combination of this fastening means imbedded in the rear wall of the rubber bumper guard, and the cup-like hollow in the same wall, and the choice of two bolt positions that enables my inflated rubber bumper guard to be attached to so many different shapes and styles of auto bumpers.

I claim:

1. An inflated rubber bumper guard for vehicles substantially as described and illustrated comprising a rubber casing which is taller than it is wide but wider near the top than near the bottom, said casing having a lower rear wall which is substantially thicker than any of its other walls and an upper rear wall which is substantially the same thickness as the other walls excepting said lower rear wall, said lower rear wall containing an inwardly extending cup-like hollow and means molded in said wall for attaching said guard to a bumper, and said upper rear wall containing means for admitting air under pressure into said casing.

2. An inflated rubber bumper guard for vehicles substantially as described and illustrated comprising a rubber casing which is taller than wide with the upper half wider than the lower half, said casing having a lower rear wall which is considerably thicker and differently shaped than any of its walls and an upper rear wall which is substantially the same thickness as the other walls excepting said lower rear wall, said lower rear wall containing an inwardly extending cup-like hollow, means molded in said lower rear wall which had previously been shaped and crimped so as to be securely imbedded in said wall for attaching said guard to a bumper, and means located in said upper rear wall for introducing air under pressure into said casing.

3. A rubber bumper guard substantially as described and illustrated comprising a rubber casing which is taller than it is wide but wider at the top than at the bottom, said casing having a lower rear wall which is substantially thicker than any of its other walls and an upper rear wall which is approximately the same thickness as the other walls except said lower rear wall, said lower rear wall having its exterior surface indented to form a cup-like hollow, said substantially thicker lower rear wall having elements molded therein for securely attaching said bumper guard to a bumper, and said upper rear wall containing means for introducing air into said casing.

References Cited in the file of this patent

UNITED STATES PATENTS

| Number | Name | Date |
|---|---|---|
| 1,724,431 | Spear | Aug. 13, 1929 |
| 1,834,824 | Brown | Dec. 1, 1931 |
| 1,978,179 | Weiland | Oct. 23, 1934 |
| 2,243,462 | Fageol | May 27, 1941 |